350-406
XR  3,594,457

July 20, 1   3,594,457
PARENT

INVENTOR.
Richard T. Wright

BY Brown and Mikulka
and
James L. Neal
ATTORNEYS

United States Patent Office 3,594,457
Patented July 20, 1971

3,594,457
METHOD OF PRESS FORMING BIREFRINGENT TRANSPARENT POLYETHYLENE TEREPHTHALATE SHEETS
Richard F. Wright, Arlington, Mass., assignor to Polaroid Corporation, Cambridge, Mass.
Filed June 12, 1967, Ser. No. 645,237
Int. Cl. B29d 11/00; B29c 1/04
U.S. Cl. 264—1                                    12 Claims

ABSTRACT OF THE DISCLOSURE

This disclosure concerns a process for press-forming lenticular or prismatic configurations in one side of a sheet of dimensionally stable material, such as a polyethylene terephthalate composition of the type commonly known as Mylar, and the improved optical device produced thereby.

SUMMARY OF THE INVENTION

This invention involves a two-step, press-forming process for producing an optical device having light ray deflecting configurations in one side thereof from a sheet of optical material characterized by a high degree of dimensional stability, and the improved optical device formed by the process. Referring to general structural considerations, the configurations may be convex or concave lenticulations. Convex lenticules may, for example, be of a spherical, cylindrical or elliptical form depending upon optical requirements, and concave lenticules, may be of any chosen concave contour. Further, prismatic contours and slopes may be produced when desired. For convenience, the configurations will be referred to as lenticulations but it should be understood that all matter contained herein applies equally to formation of various other surface configurations.

One material having useful optical properties and characterized by a high degree of dimensional stability which is amenable to the process discussed above is, for example, a transparent polyethylene terephthalate composition, commercially available under the name Mylar. The dimensionally stable material will, for convenience, hereafter be referred to as Mylar but it should be understood that other materials are included within the scope of the invention.

Mylar, when stretched, is molecularly oriented along the axis of stretch and is thereby rendered birefringent. Birefringent Mylar, when lenticulated, is useful in the production of optical devices such as light polarizing devices of the type shown and described in U.S. Pat. No. 3,213,753, which issued Oct. 26, 1965, to Howard G. Rogers for a Multilayer Lenticular Light Polarizing Device. However, the dimensionally stable character of Mylar gives rise to difficulties in forming a lenticular surface thereon without impairment or destruction of the aforesaid optical properties. Further, when a press-forming operation is carried out at suitable operating temperatures and pressures, Mylar tends to retain its shape and fail to crown fully into concavities of a lenticular press-forming surface. The result is a partial formation of the lenticules, the required shape thereof not being obtained. Attempts to form Mylar to the desired shape by use of relatively intense heat or pressure, or both, are not met with practical success. Under such temperatures and pressures, the optical properties of Mylar may be impaired and eventually, if temperatures and pressures are sufficiently increased, it crystallizes, becomes brittle and breaks apart when handled. Additionally, it must be considered that cost of production increases substantially as operating pressures and temperatures are increased. Thus, even if Mylar could be formed to the required shape without loss of its optical properties, the lowest operating temperatures and pressures possible might remain economically desirable.

According to the two-step forming process of this invention, a plane sheet of Mylar is located upon a lenticulated forming surface of a dye having greater dimensional stability than the Mylar, portions of the Mylar spanning concavities of the lenticulations of the forming surface. It is pressed between the lenticulated forming surface and a deformable pressing member having less dimensional stability than the Mylar and defining a deformable, planar forming surface. Temperature and pressure is maintained below that which result in loss or impairment of the aforesaid optical properties. The deformable member flows during the press-forming operation, from high pressure zones over raised portions of the lenticulated forming surface toward the concavities of the lenticulated surface to force the material spanning the concavities of the lenticulations to flow into the concavities. A result is that the two surfaces of the sheet tend to approach somewhat complementary configurations. Thus, during this pressing operation, the Mylar is forced to crown into the concavities of the lenticulated forming surface with a minimum of dimensional change. However, since the deformable planar forming surface conforms to a shape somewhat complementary to the lenticulated one, lenticulations are produced in both sides of the Mylar sheet. The lenticulations formed in the side of the sheet adjacent the lenticulated forming surface conform to the shape of the forming surface as desired. The lenticulations formed in the side of the sheet adjacent the deformable forming surface are imperfectly formed secondary lenticulations which are, undesired. To remove the undesired lenticulations, the sheet is subjected to a subsequent pressing operation wherein it is positioned identically the same relative to the lenticulated forming surface as in the former press-forming operation and pressed between the lenticulated forming surface and a rigid, smooth forming surface. The smooth forming surface levels the aforesaid undesired lenticulations and forms an optically smooth surface.

The two-step process of this invention thereby produces, in a relatively uncomplicated manner, an accurately formed optical device having one configured surface, while utilizing relatively low operating temperatures and pressures.

It is a primary object of this invention to provide an optical device having light refracting configurations on one side and a smooth side opposite the configurated side.

It is also a primary object of this invention to provide a process for forming an optical device having light refracting configurations on one side and a smooth side opposite the configured side.

It is an object of this invention to provide a process for press-forming light refracting configurations upon one side of a sheet of dimensionally stable optical material.

A further object of this invention is to provide a process for press-forming light refracting configurations in one side of a sheet of birefringent polyethylene terephthalate without adversely affecting the optical properties thereof.

Other objects of this invention will in part be obvious and will in part appear hereinafter.

DETAILED DESCRIPTION OF THE DRAWINGS

Figure 1:
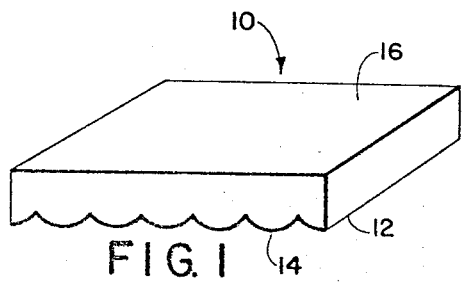
FIG. 1 is a perspective view of an optical device of this invention.

A lenticular sheet formed according to the process of this invention may comprise, for example, device 10, shown in FIG. 1. Device 10 includes a side 12 having a number of lenticulations 14, and a smooth side 16.

Figure 2:
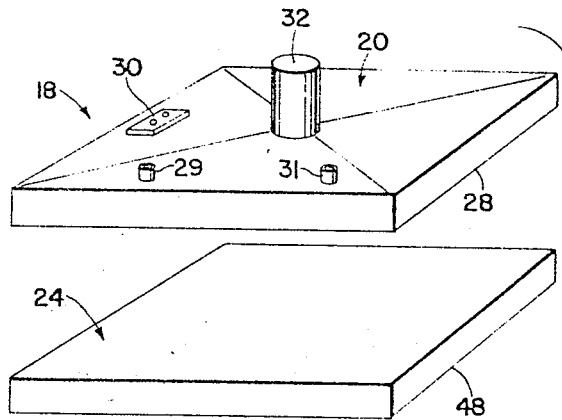
FIG. 2 is a perspective view showing one suitable apparatus for performing the process of this invention.

Referring now to FIG. 2, the apparatus comprises press 18 including platen means 20, platen means 22, forming means 24, and drive means 26.

Platen means 20 includes rigid, optically smooth forming surface 28, cooling fluid inlet 29 and outlet 31, electrical connection 30 for electrical forming surface heating means, not shown, and means 32 fixedly mounting forming surface 28 relative to platen means 22. Platen means 22 includes optically smooth surface 34 having lenticulations 36 therein. The lenticulations define concavities 38 and ridges 40. Also included within platen means 22 are cooling fluid inlet 41 and outlet 43, electrical connection 42 for electrical forming surface heating means, not shown, and movable support means 44. Hydraulic drive means 46 moves forming surface 34 into cooperating operative relationship with surface 28 and forming means 24.

Forming means 24 is a sheet of deformable material having forming surface 48. A number of deformable materials which may be formed into a sheet having at least one smooth surface are suitable for use as forming means 24. Rubber is one preferred material since it is characterized by a high degree of resilience which permits its repeated usage. Another preferred material is lead. Since lead lacks resilience, it should be either replaced or subjected to a surface reforming operation after each use.

The process which forms the subject of this invention will now be discussed in connection with FIGS. 3 through 6.

Figure 3:
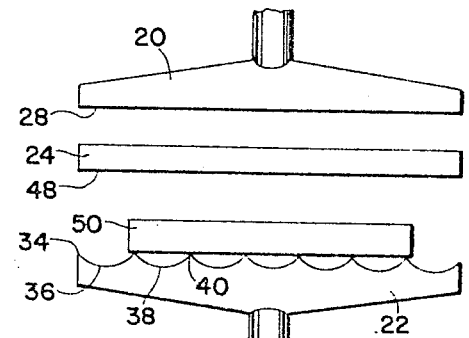
FIG. 3 is a side elevation of the apparatus of FIG. 2 showing one step in the process of this invention.
Figure 4:
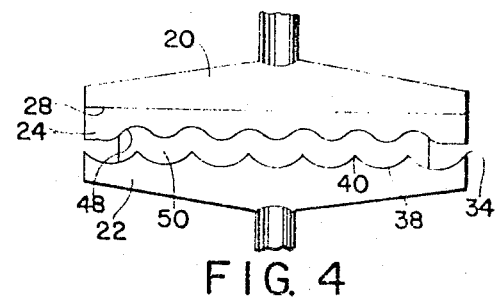
FIG. 4 is a side elevation of the apparatus of FIG. 2 showing another step in the process of this invention.

Referring to FIG. 3, workpiece 50 is located upon lenticular forming surface 34 and covered with forming means 34. Drive means 46 is activated to move surface 34 into working relationship with surface 48 of sheet 24 and surface 34, the flow in the forming means forces portions 24 and workpiece 50 are pressed between platen means 20 and 22, as shown in FIG. 4. The platens are heated to an appropriate forming temperature, for example 375° F. The heat renders the workpiece more malleable and the pressure tends to cause material in forming means 24 to flow toward the concavities of lenticulations 38 of forming surface 34. As the shape of forming surface 48 of the forming means approaches conformity to the shape of surface 34, the flow in the forming means forces portions of the workpiece into the concavities of lenticulations 38 so that forming surface 34 is accurately reproduced in a surface of the workpiece.

Figure 5:
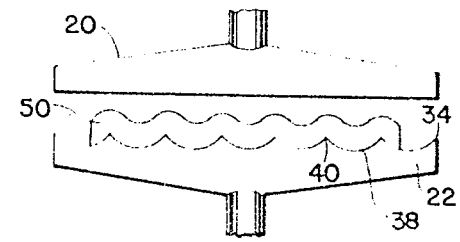
FIG. 5 is another side elevation of the apparatus of FIG. 2 showing a step in the process of this invention.

Drive means 26 retracts platen means 22; the pressure upon workpiece 50 is relieved, and sheet 24 is removed from between the platens, thus uncovering the workpiece. This condition is as shown in FIG. 5.

The deformable surface of forming means 24 produces undesired, imperfect lenticulations in the surface of the workpiece adjacent thereto. The unwanted lenticulations are removed by the subsequent steps, described below.

Figure 6:
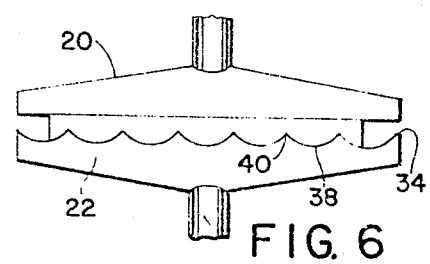
FIG. 6 is also a side elevation of the apparatus of FIG. 2 showing a further step in the process of this invention.

The forming surfaces 28 and 34 of platens 20 and 22 respectievly, are again moved into working relationship by drive means 26, as shown in FIG. 6, to press workpiece 50 between lenticular forming surface 34 of platen 22 and smooth forming surface 28 of platen 20, the workpiece having the same position relative to the platens as in the previous pressing operation. Smooth forming surface 28 presses the undesirable, imperfect lenticulations to a planar optical surface. After the latter pressing operation, the platens are cooled by cooling fluid passed through inlets 29 and 41, through platens 20 and 22, and outlets 31 and 43. The platens are then separated to relieve the pressure and permit removal of formed birefringent, lenticulated device 10.

Not only does the above described two-step process correctly form the Mylar workpiece to the shape of the lenticulated forming surface, but it also better preserves its birefringence than does a one-step process wherein the workpiece is press-formed between a lenticulated forming surface and a rigid, smooth forming surface, without use of the deformable member. When press-forming of the Mylar workpiece without the deformable member is attempted, relatively great deformation occurs in zones of the workpiece located adjacent ridges of the lenticular forming surface and causes substantial disruption of molecular orientation. A substantial alteration of birefringence results. On the other hand, when the two-step process is used, alteration of molecular orientation is substantially reduced.

The degree of alteration of orientation can be observed when a formed device is viewed between a pair of polarizers having their optical axis arranged perpendicularly. When there is uniform orienation, a uniform amount of light is observed. However, if there is alteration of orientation in the aforementioned zones, a variation in the amount of light passing through these zones is observed. For example, when the lenticulated device is positioned with its axis of molecular orientation at forty-five degrees to the axes of orientation of the crossed polarizers, the zones of altered orientation appear relatively dark; when the axis of orientation of the lenticulated device is aligned with the optical axis of one of the polarizers, the zones of altered orientation transmit light and are seen as relatively light areas. Zones of altered orientation may clearly be seen by this operation when the aforementioned one-step process is used, but when the two-step process of this invention is used zones of alternations are reduced in size ot the extent that they are optically unobjectionable and must be viewed under magnification to be seen.

Figure 7:
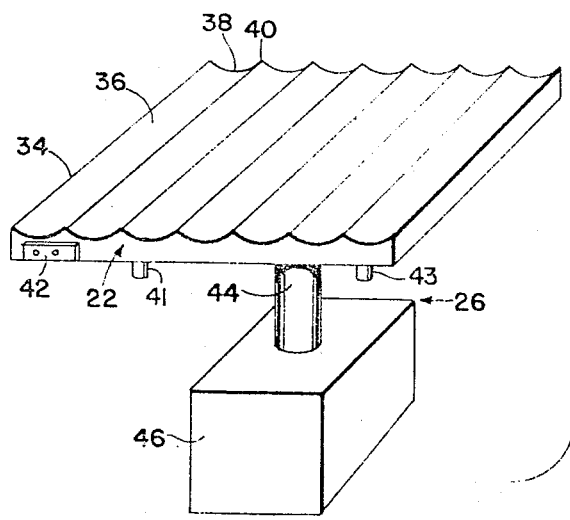
FIG. 7 is a side elevation of another optical device of this invention.
Figure 7:
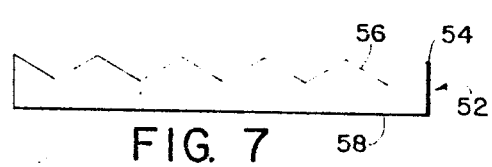

FIG. 7 shows one prismatic device 52, which may also be formed by the process of this invention. Device 52 includes a side 54 having prismatic formations 56, and smooth side 58.

It is apparent from the foregoing that this invention provides a process for press-forming lenticulations in one side of a sheet of dimensionally stable optical material without adverse effect upon the optical properties thereof.

Since certain changes may be made in the above process without departing from the scope of the invention herein involved, it is intended that all matter contained in the above description or shown in the accompanying drawings shall be interpreted as illustrative and not in a limiting sense.

I claim:

1. A process for press-forming surface configurations in one side of a sheet of birefringent transparent polyethylene terephthalate which is dimensionally stable at the forming temperature comprising the steps of:
   (a) pressing and heating said sheet to an elevated temperature, whereat said sheet retains its dimensional stability and birefringence, against a configured forming surface to produce desired configurations in one side thereof while causing the other side thereof to deform so as to facilitate complete conformance of said one side with said configured forming surface; and subsequently,
   (b) pressing and heating said sheet to said elevated temperature between a forming surface matching the configurations formed in said one side of said sheet and another forming surface to remove deformations formed in said other side of said sheet during the previous pressing step, whereby said sheet's original birefrigence is not materially impaired.

2. A process for press-forming surface configurations in one side of a sheet of stretch oriented birefrigent transparent polyethylene terephthalate which is dimensionally stable at the forming temperature comprising the steps of:
   (a) pressing and heating said sheet to an elevated temperature, whereat said sheet retains its dimensional stability, orientation and birefrigence, between a configured forming surface and a deformable material to produce configurations in both sides of said sheet, and, subsequently,
   (b) pressing and heating said sheet to said elevated temperature between a configured forming surface matching the configurations formed in the surface of said sheet by the first said configured forming surface and a rigid, substantially smooth forming surface to remove configurations from the side of said sheet adjacent said smooth surface, whereby said sheet's original birefringence and orientation are not materially impaired.

3. A process according to claim 2 wherein said surface configurations are lenticular.

4. A process according to claim 2 wherein said surface configurations are prismatic.

5. A process according to claim 2 wherein said deformable material comprises rubber.

6. A process according to claim 2 wherein said deformable material comprises lead.

7. A process for press-forming surface configurations in one side of a sheet of birefrigent transparent polyethylene terephthalate material which is dimensionally stable at the forming temperature comprising the steps of:
   (a) locating said sheet on a configured forming surface;
   (b) covering said sheet with a deformable material;
   (c) pressing and heating said sheet to an elevated temperature, whereat said sheet retains its dimensional stability and birefringence, between said deformable material and said configured forming surface to form configurations in both surfaces thereof;
   (d) relieving pressure applied during the above said pressing step;
   (e) removing said deformable material to uncover said sheet; and, subsequently,
   (f) pressing and heating said sheet to said elevated temperature between said configured forming surface and a rigid, substantially smooth forming surface to remove said configurations from the side of said sheet adjacent said smooth surface, whereby said sheet's original birefrigence is not materially impaired.

8. A process according to claim 7 wherein said surface configurations are lenticular.

9. A process according to claim 7 wherein said surface configurations are prismatic.

10. A process according to claim 7 wherein said deformable material comprises rubber.

11. A process according to claim 7 wherein said deformable material comprises lead.

12. A process for press-forming lenticules in one side of a sheet of a polyethylene terephthalate composition comprising the steps of:
   (a) locating said sheet on a lenticulated forming surface;
   (b) covering said sheet with a deformable material;
   (c) pressing said sheet between said deformable material and said lenticulated forming surface to form lenticulations in both surfaces thereof;
   (d) heating said sheet material while it is being pressed between said lenticulated surface and said deformable material;
   (e) relieving pressure applied during said forming step;
   (f) removing said deformable material to uncover said sheet;
   (g) pressing said sheet between said lenticulated forming surface and a rigid, smooth forming surface to remove lenticulations from the side of said sheet adjacent said smooth surface;
   (h) heating said sheet material while it is being pressed between said lenticulated forming surface and said rigid, smooth forming surface;
   (i) cooling said platens; and
   (j) relieving pressure applied during the last said pressing step.

References Cited

UNITED STATES PATENTS

| | | | |
|---|---|---|---|
| 3,030,173 | 4/1962 | Kurzke et al. | 264—342 |
| 1,377,515 | 5/1921 | Novotny | 264—296 |
| 2,578,209 | 12/1951 | Schwartz | 18—56 |
| 2,812,549 | 11/1957 | Wall | 264—294 |
| 2,823,421 | 2/1958 | Scarlett | 264—289 |
| 1,377,501 | 5/1921 | Novotny | 264—293 |
| 1,930,167 | 10/1933 | Goodwin | 264—293 |
| 2,218,351 | 10/1940 | Crowell | 264—293 |
| 2,258,353 | 10/1941 | Doane | 264—293 |
| 2,334,233 | 11/1943 | Wood | 264—293 |
| 2,899,708 | 8/1959 | Donaldson et al. | 264—293 |
| 3,064,401 | 11/1962 | Mooney | 264—1 |
| 3,241,429 | 3/1966 | Rice et al. | 264—1 |
| 3,311,692 | 3/1967 | Baird | 264—293 |

JULIUS FROME, Primary Examiner

A. H. KOECKERT, Assistant Examiner

U.S. Cl. X.R.

264—293, 294, 316